Aug. 9, 1927.

H. FORD 1,638,118

MEANS FOR SOUNDPROOFING GEAR MECHANISMS

Filed April 22, 1926

Inventor
Henry Ford.
By
E. L. Davis.
Attorney

Patented Aug. 9, 1927.

1,638,118

UNITED STATES PATENT OFFICE.

HENRY FORD, OF DEARBORN, MICHIGAN.

MEANS FOR SOUNDPROOFING GEAR MECHANISM.

Application filed April 22, 1926. Serial No. 103,954.

My invention relates to means for soundproofing gear mechanisms and has for its object to reduce the noise incident to the operation of gears which are not wholly immersed in oil while in operation. I accomplish this object by the means hereinafter described and illustrated in the accompanying drawings, in which.

Figure 1:
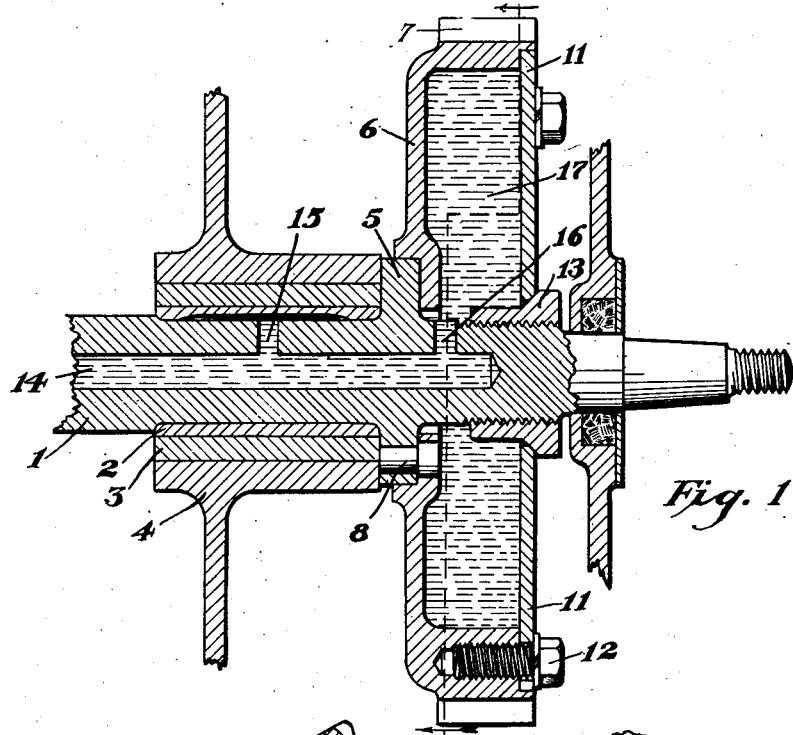
Fig. 1 is a section through a cam-shaft of a motor vehicle and a timing gear mounted on the end thereof.
Figure 2:
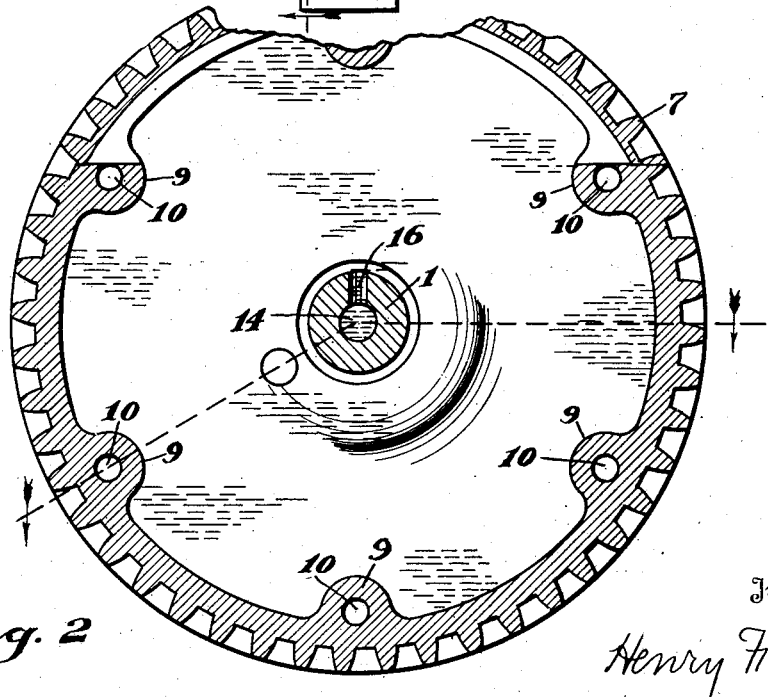
Fig. 2 is a section taken on line $x$—$x$ of Fig. 1.

In the accompanying drawings reference numerals are employed to indicate the several parts. 1 is a cam-shaft which may be of the type in general use for such purpose, 2 is a babbitt sleeve on which is mounted a bearing 3 which in turn is supported in an aperture produced in the web 4 of the cylinder-block. 5 is a flange on the cam-shaft. 6 is a gear-ring on the outer periphery of which are gear-teeth 7. The gear-ring is secured to the cam-shaft by means of a pin 8 which forms the driving engagement for the gear. The gear-ring is provided with a series of bosses 9 in which are screw-threaded apertures 10. A plate 11 is adapted to fit one face of the gear-ring and is secured thereto by means of bolts 12 and also by the nut 13 which passes partially through an aperture in the center of the plate and is tightened against the plate by means of its screw-threaded connection with the end of the cam-shaft. The gear-ring thus constructed is hollow and has a relatively thin wall and forms a fluid-tight compartment for receiving and holding in contact with its walls constituting the body of the gear-ring, a fluid such as oil or other liquid substances. In the cam-shaft I provide a canal 14 which is fed under pressure with oil from a suitable source of supply. From this canal is a lead 15 which carries oil to the cam-shaft bearing, and a lead 16 in the cam-shaft communicates with the hollow portion of the gear-ring and permits the oil to be forced into the gear-ring until the latter is completely filled with oil, 17. It is thus seen that the body of the gear-ring is at all times in contact with a body of oil.

Now I have discovered that if you cause a body of oil to contact with the parts of a gear-ring which carries the gear-teeth, though not with the teeth, the noise which otherwise accompanies the operation of the gear will be greatly reduced, and have illustrated and described one way of constructing a gear so that a body of oil, fluid or semifluid substance may be utilized to accomplish the aforesaid result.

Having fully described my invention and its mode of operation, what I claim is:

1. In a device of the class described, a shaft having a flange spaced from one end thereof, a gear ring mounted on said flange, a plate secured to one side of said gear ring and adapted to form a fluid compartment therewith, and a nut threaded to said shaft to form a combined closure and locking member whereby the gear assembly may form a fluid tight compartment for a sound deadening liquid and will be held from movement axially of the shaft.

2. In a device of the class described, a shaft having a flange spaced from one end thereof and an oil canal therein terminating in an outlet lead adjacent to said flange, a gear ring mounted on said flange, a plate secured to one side of said gear ring and adapted to form a compartment therewith, and a nut threaded to the shaft to thereby bear against the plate to form a combined locking and sealing member, whereby the gear assembly may form a fluid tight compartment for a sound deadening liquid and will be held from movement axially of the shaft.

Signed at the city of Dearborn, county of Wayne, State of Michigan, this 15th day of April, 1926.

HENRY FORD.